United States Patent [19]
Akagi et al.

[11] Patent Number: 5,420,835
[45] Date of Patent: May 30, 1995

[54] MAGNETO-OPTIC DISK APPARATUS

[75] Inventors: Toshiya Akagi, Neyagawa; Yukinori Okazaki, Hirakata, both of Japan

[73] Assignee: Matsushita Electric Industrial Co., Ltd., Osaka, Japan

[21] Appl. No.: 888,547

[22] Filed: May 22, 1992

[30] Foreign Application Priority Data

May 24, 1991 [JP] Japan .................................. 3-119838
Apr. 22, 1992 [JP] Japan .................................. 4-102600

[51] Int. Cl.⁶ .............................................. G11B 7/00
[52] U.S. Cl. .......................................... 369/13; 360/59
[58] Field of Search ...................... 369/13, 14; 360/59, 360/114; 365/122

[56] References Cited

U.S. PATENT DOCUMENTS

| 4,754,446 | 6/1988 | Reno | 369/112 |
| 4,879,703 | 11/1989 | Kaku et al. | 369/13 |
| 4,991,158 | 2/1991 | Wada | 369/13 |
| 5,204,847 | 4/1993 | Tayefeh | 369/13 |

FOREIGN PATENT DOCUMENTS

| 0276808 | 8/1988 | European Pat. Off. . |
| 0332408 | 9/1989 | European Pat. Off. . |
| 0429221 | 5/1991 | European Pat. Off. . |

Primary Examiner—Tony M. Argenbright
Attorney, Agent, or Firm—Ratner & Prestia

[57] ABSTRACT

In an magneto-optic disk apparatus which carries out recording, playback, or erasing of data with a single laser beam, recorded data is read simultaneously with a recording or erasing operation to eliminate the time of waiting for the disk to make a turn. A signal separation circuit 7 is provided for a magneto-optic disk apparatus which carries out recording, playback, erasing of data by applying a laser beam through an optical head 2 to a spot on a magneto-optic disk 3. In a recording or erasing operation, a magneto-optic playback signal 6 obtained from reflected light of a recording or erasing beam is input to the signal separation circuit 7 to separate and output the recorded data signal 8 contained in the magneto-optic playback signal 6 to consequently reading a recorded data signal 10 simultaneously with carrying out a recording or erasing operation.

10 Claims, 10 Drawing Sheets

MAGNETO-OPTIC DISK APPARATUS

BACKGROUND OF THE INVENTION

1. Field of the Invention

The present invention relates to a magneto-optic disk apparatus, and more in particular to data reading before erasing (referred to as "erase-after-read" hereinafter) system and data reading before writing (referred to as "write-after-read" hereinafter) system in a magneto-optic disk apparatus for recording, playing back, or erasing a data signal on a magneto-optic disk by means of a semiconductor laser.

2. Description of the Prior Art

Recently, with a growing demand for increasing the capacity and operation speed of a data memory unit, there has been paid much attention to a magneto-optic disk apparatus for recording, playing back, or erasing a data signal on a magneto-optic disk utilizing a semiconductor laser.

FIG. 9 shows a block diagram of an ordinary conventional magneto-optic disk apparatus of a magnetic field modulation type. Referring to FIG. 9, the magneto-optic disk apparatus comprises a semiconductor laser unit 1, an optical head 2, a magneto-optic disk 3 which is provided with a recording film 4, a bias magnetic field unit 5 for exerting a bias magnetic field to the recording film 4 by receiving a recording signal 13 transmitted from a CPU 14. The apparatus further comprises a binary coding circuit 9 outputting a playback signal 10 to the CPU 14, and a semiconductor laser drive circuit 11 for driving the semiconductor laser unit 1. A record/playback/erase changeover signal 12 is transmitted to the drive circuit 11 from the CPU 14.

In regard to the mutual relations and operations of the above-mentioned constituent units of the magneto-optic disk apparatus, the following describes the procedures for carrying out data recording or erasing on the magneto-optic disk 3 according to, for example, a magnetic field modulation type magneto-optic disk apparatus with reference to FIG. 9. Laser beams emitted from the semiconductor laser unit 1 are focused on the recording film 4 on the magneto-optic disk 3 through the optical head 2. The recording film 4 is designed to be magnetically orientated in a direction perpendicular to the film surface when in an unrecording mode (i.e., data erasing mode) in such a manner that the magnetization of the recording film 4 is oriented, for example, in the direction from the laser beam incident side to the recording film 4.

In the data recording mode, the CPU 14 transmits a record/playback/erase changeover signal 12 to the semiconductor laser drive circuit 11 to control the semiconductor laser unit 1 to yield such a high optical output of the laser beam that the laser beam incident portion of the recording film 4 can be maintained at a temperature not lower than the Curie point of the film member. The CPU 14 further outputs a recording signal 13 to the bias magnetic field unit 5 to modulate the bias magnetic field exerted to the recording film 4 in a direction perpendicular to the recording film surface. The bias magnetic field is so modulated depending on the recording signal 13 that the bias magnetic field is oriented in the direction from the laser beam incident side to the recording film 4 when the recording data is "0", or otherwise so modulated that the bias magnetic field is oriented in the direction from the recording film 4 to the laser beam incident side when the recording data is "1".

The coercive force of the recording film 4 is reduced to zero at a temperature not lower than the Curie point, so that the recording film 4 is magnetically oriented in the direction of the current bias magnetic field exerted to the recording film 4. When the recording film 4 passes through the laser beam application position and the temperature thereof becomes lower than the Curie point, the magnetization of the magnetized recording film 4 is maintained in the direction of the currently modulated bias magnetic field thereby to complete the data recording operation.

In the data playback mode, the CPU 14 transmits a record/playback/erase changeover signal 12 to the semiconductor laser drive circuit 11 to control the semiconductor laser unit 1 to generate such a low optical output of the laser beam that the laser beam incident portion of the recording film 4 is suppressed at a temperature lower than the Curie point for maintaining the coercive force. Therefore, the current magnetization of the recording film 4 is maintained because the coercive force thereof is not reduced to zero. The polarization of the laser beam applied to the recording film 4 is rotated under application of the bias magnetic field when the laser beam is reflected on the recording film 4 due to an interaction with the magnetized recording film 4. This effect is known as "Kerr effect" in the art. Since the magnetization direction of the recording film 4 differs depending on which is selected the recording state or the unrecording state, the direction of the rotation angle of the polarization of the laser beam also differs. The different rotation amount and direction of the polarization of the laser beam is detected by means of the optical head 2 thereby to play back the recorded data signal.

In the erasing operation mode., the CPU 14 controls the recording signal 13 to be only "0" so that the bias magnetic field unit 5 continues to generate a bias magnetic field onto the recording film 4 with the same magnetic orientation as that in the unrecording mode, in other words, the recording film 4 is magnetized in such a manner that the magnetization of the recording film 4 is oriented in the direction from the laser beam incident side to the recording film 4. The other operations in the erasing operation mode are carried out in the same manner as in the recording mode.

FIG. 10 shows a schematic diagram of an ordinary conventional optical modulation type magneto-optic disk apparatus. Referring to FIG. 10, the apparatus comprises a semiconductor laser unit 101 for generating a laser beam, an optical head 102 receiving the laser beam reflected on a recording film and transmitting a magneto-optic playback signal 106 to a binary coding circuit 119 which transmits a playback signal 120 to a CPU 125. The apparatus further comprises a magneto-optic disk 103 which is provided with the recording film 104, a bias magnetic field unit 105 for exerting a bias magnetic field to the recording film 104, and a semiconductor laser drive circuit 111. The CPU 125 transmits a bias magnetic field control signal 112 to the bias magnetic field unit 105, a record/playback/erase changeover signal 113 and a recording signal 114 to the semiconductor laser drive circuit 111. The above-mentioned construction is similar to that of the apparatus in FIG. 9 except for some functions of several constituent elements.

The following describes data recording and erasing operations on the magneto-optic disk 103 according to the optical modulation method with reference to FIG.

10. Laser beams emitted from the semiconductor laser unit 101 are focused on the recording film 104 provided on the magneto-optic disk 103 through the optical head 102. The recording film 104 is magnetically oriented in a direction perpendicular to the film surface in the unrecording state. In the unrecording state, the magnetization of the recording film 104 is oriented in the direction from the laser beam incident side to the recording film 104.

In the recording operation mode, the CPU 114 transmits the bias magnetic field control signal 112 to the bias magnetic field unit 105 to generate a bias magnetic field such that the magnetization of the recording film 104 is oriented in the direction opposite to the direction in the unrecording state, in other words, oriented from the recording film to the laser beam incident side. Then the record/playback/erase changeover signal 113 and the recording signal 114 are transmitted to the semiconductor laser drive circuit 111 to modulate the laser beam output of the semiconductor laser unit 101. The modulation of the laser beam output is so effected as to change the temperature distribution of the recording film 104. When the temperature of the recording film 104 is increased not lower than the Curie point, the coercive force of the recording film 104 is reduced to zero, so that the recording film 104 is magnetically oriented in a direction of the bias magnetic field currently exerted from the bias magnetic field unit 105 to the recording film 104. When the laser beam application is completed and the temperature of the recording film 104 is made lower than the Curie point, the coercive force of the recording film 104 is recovered and the magnetic orientation of the magnetized recording film 104 is maintained in the direction of the current bias magnetic field thereby to complete the recording operation.

In the playback operation mode, the CPU 125 transmits the record/playback/erase changeover signal 113 to the semiconductor laser drive circuit 111 to control the semiconductor laser unit 101 to generate such a low laser beam output that the laser beam incident portion of the recording film 104 is suppressed at a temperature lower than the Curie point, and the suppressed laser beam is applied to the recording film 104 maintaining the coercive force. The polarization of the applied laser beam is rotated when reflected on the recording film 104 due to an interaction with the magnetized recording film 104. Since the magnetic orientation of the magnetized recording film 104 differs depending on which is selected the recording state or unrecording state, the rotation angle or direction of the polarization of the laser beam also differs. The different rotation amount and direction of the polarization of the laser beam is detected by means of the optical head 102 thereby to play back the recorded data signal.

In the data erasing mode, the CPU 125 transmits the bias magnetic field control signal 112 to the bias magnetic field unit 105 to generate a bias magnetic field such that the bias magnetic field is oriented in the same direction as in the unrecording mode, i.e., in the direction from the laser beam incident side to the recording film 104. Then the record/playback/erase changeover signal 113 is transmitted to the semiconductor laser drive circuit 111 to control the semiconductor laser unit 101 to generate such a high output laser beam that the recording film 104 is maintained at a temperature not lower than the Curie point. When the temperature of the recording film 104 is increased not lower than the Curie point, the coercive force of the recording film 104 is reduced to zero, so that the magnetization of the recording film 104 is oriented in the direction of the bias magnetic field currently exerted by the bias magnetic field unit 105, i.e., in the same direction as that in the unrecording state. When the laser beam application is completed and the temperature of the recording film 104 is made lower than the Curie point, the coercive force of the recording film 104 is recovered and the magnetization direction of the recording film 104 is maintained in the direction of the current bias magnetic field, i.e., in the same direction as in the unrecording state thereby to complete the erasing operation.

In the magneto-optic disk apparatus of both the magnetic field modulation type and the optical modulation type described above, there is a growing demand for providing the function of erase-after-read and write-after-read capable of recovering recorded data even when necessary data is faultily erased or overwritten, or in such an erroneous operation as track jumping of the unit.

The following describes the erase-after-read operation of the conventional magneto-optic disk apparatus. FIG. 11 shows a flow chart of the erase-after-read operation. Referring to FIG. 11, firstly the position of the recorded data to be erased is subject to playback thereby to read the recorded data at the step S11. Secondly at the step S12, the process enters a waiting mode in which at least one turn or rotation of the disk is effected until the laser beam is applied again to the specified position. Then a data erasing operation is carried out at the step S13. It takes about several tens seconds for the magneto-optic disk to make one turn, and the magneto-optic disk apparatus has nothing to do in almost the entire waiting period. For the above reasons, the waiting period for the magneto-optic disk to make one turn in the erase-after-read operation is a serious obstacle to an attempt of increasing the operation speed of the magneto-optic disk apparatus.

In regard to the write-after-read operation, a direct overwriting is theoretically permitted in a magnetic field modulation type, where the recording and erasing operations are the same except the control procedures for controlling the recording signal, and therefore the write-after-read and the erase-after-read are carried out in the same manner. FIG. 12 shows a flow chart of the write-after-read operation. Firstly at the step 21, the position of the recorded data to be written is subject to playback so that the recorded data is read. Secondly at the step S22, the process enters the waiting mode in which at least one turn of the disk is effected until the laser beam is applied again to the specified position. Then at the step S23, a writing operation is carried out. In the write-after-read operation, the waiting period for the magneto-optic disk to make one turn is also a serious obstacle to increasing the operation speed of the magneto-optic disk apparatus for the same reasons as in the erase-after-read operation.

As shown in FIG. 13, for giving solution of the above-mentioned problems, there is a method of carrying out write-after-read or erase-after-read operations without waiting period for the magneto-optic disk to make at least one turn by employing two semiconductor laser units of a precedent-spot semiconductor laser unit 53 and a main-spot semiconductor laser unit 51, wherein the playing back operation of the recorded signal is effected with a precedent beam spot 58 while the recording and erasing operations are carried out with a main beam spot 59.

Other than the above-mentioned method, there is a method of using a two-beam semiconductor laser unit 65 as shown in FIG. 14, or a method of dividing the forward output light of a semiconductor laser unit 66 by means of a diffraction grating 67 to produce multi-laser beam to be applied onto a recording film 61 of a magneto-optic disk 60 as shown in FIG. 15.

For instance, in the aforesaid conventional magneto-optic disk apparatus where the two semiconductor laser units, i.e., the precedent-spot semiconductor laser beam 53 and the main-spot semiconductor laser beam 51 are used as shown in FIG. 13, two independent semiconductor laser drive circuits are necessary respectively for the employed two semiconductor laser units. The above fact results in a complicated circuit and requirement of focusing the two semiconductor laser beams on the recording film 61 of the magneto-optic disk 60 concurrently without aberration, which also leads to a complicated optical system and difficulty in designing and adjustment and therefore resulting in cost increase.

Also in the method of employing the two-beam semiconductor laser unit 65 for simplification of the optical system as shown in FIG. 14, however, the method is basically not free of the above-mentioned problems of the complication of the optical system, and two semiconductor laser beam drive circuits fatally causes the same circuit problems as described above.

In the method where the forward output laser beam of the semiconductor laser unit 66 is divided through the diffraction grating 67 into multi-laser beams to be applied onto the recording film 61 of the magneto-optic disk 60 as shown in FIG. 15, only one semiconductor laser unit is employed to permit provision of one semiconductor laser drive circuit giving solution to the circuit problems, however, the optical system has the same problems as in the aforesaid two examples.

SUMMARY OF THE INVENTION

Accordingly, the object of the present invention is to provide a magneto-optic disk apparatus capable of easily carrying out a write-after-read or erase-after-read operation with one semiconductor laser unit in one action without waiting for the magneto-optic disk to make a turn not resorting to multi-laser beams nor altering the existing recording/playback system.

In order to achieve the above-mentioned object, the present invention provides a magneto-optic disk apparatus comprising: a semiconductor laser unit; a magneto-optic disk on which data is recorded or erased by modulation means; an optical head which carries out recording, playback, or erasing of data by means of focusing the laser beam emitted from the semiconductor laser unit at a spot on the recording film of the magneto-optic disk; a signal separation circuit; a binary coding circuit for converting an output of the signal separation circuit into a binary data; a semiconductor laser drive circuit for controlling the optical output of the semiconductor laser unit according to the recording, playback, or erasing operation; bias magnetic field means for exerting a bias magnetic field on the recording film of the magneto-optic disk according to the recording or erasing operation; and a control circuit for controlling the operations of the above-mentioned constituent elements, whereby, when carrying out a recording or erasing operation by continuously applying the laser beam spot on the magneto-optic disk, data which is already recorded on the magneto-optic disk and just subject to a recording or erasing operation is read simultaneously with the recording or erasing operation by inputting a magneto-optic playback signal obtained from the light reflected on the magneto-optic disk in the recording or erasing operation to the signal separating circuit and separating the signal component of the data already recorded to form an output.

According to the above-mentioned construction of the present invention, simultaneously with carrying out a recording or erasing operation in the modulation system on the magneto-optic disk by means of a high-power laser beam application from the semiconductor laser unit, a magneto-optic signal obtained through the optical head from the laser beam reflected on the magneto-optic disk is subject to playback in order to read the data already recorded on the disk. The above-mentioned construction enables a write-after-read and erase-after-read operation without waiting for the magneto-optic disk to make a turn to therefore result in a high-speed magneto-optic disk apparatus. The advantageous factor of employing only one semiconductor laser unit having a single laser beam permits use of a conventional optical and circuit systems without changing the optical head construction of the existing recording/playback/-erasing system, which leads to easily achieving a low-cost magneto-optic disk apparatus with high reliability.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
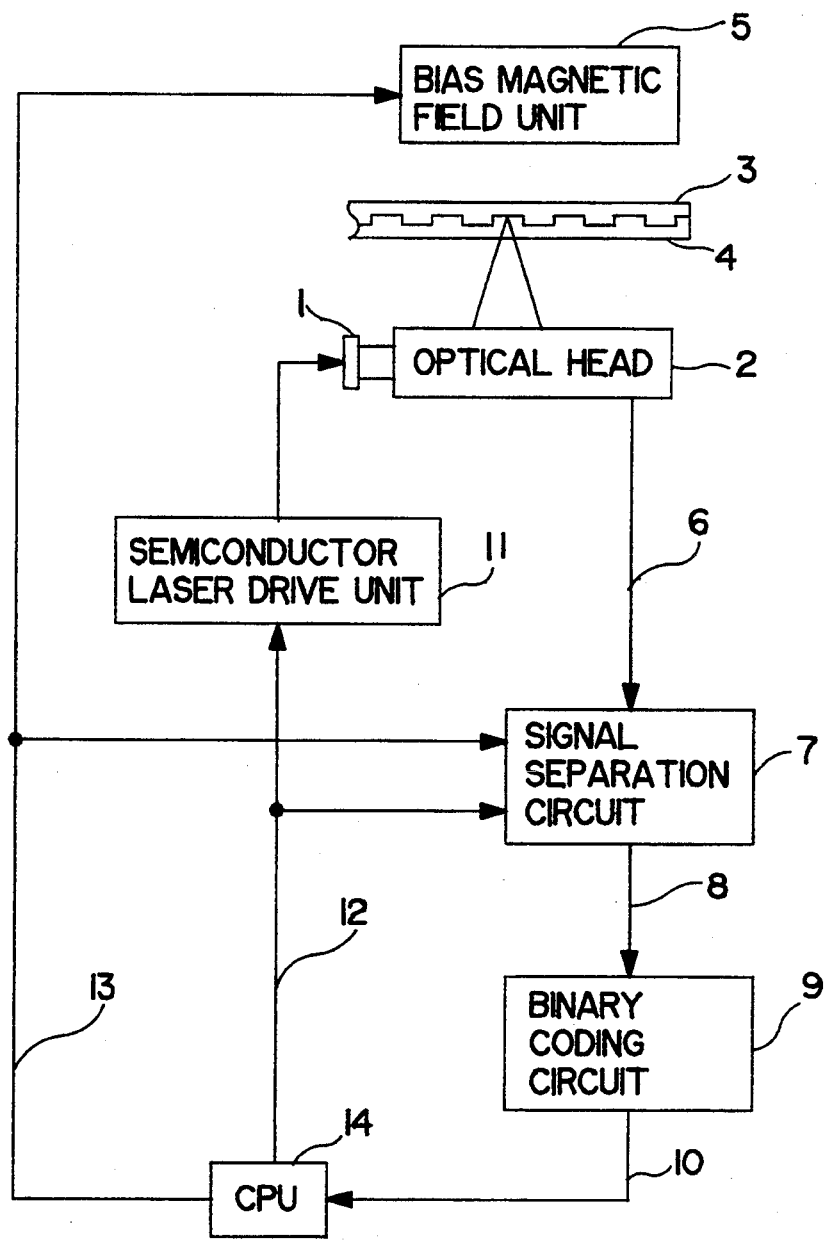
FIG. 1 is a block diagram of the construction of a magneto-optic disk apparatus in accordance with an embodiment of the present invention.

Before the description proceeds, it is noted that since the basic structure of the magneto-optic disk apparatus is similar to those of the conventional magneto-optic disk apparatus, like parts are designated by the same reference numerals.

The following describes a first embodiment of a magneto-optic disk apparatus in accordance with the present invention with reference to the attached drawings. FIG. 1 shows a block diagram of a construction of a magneto-optic disk apparatus of a magnetic field modulation type in accordance with a first embodiment of the present invention. Referring to FIG. 1, the magneto-optic disk apparatus comprises a semiconductor laser unit 1 for emitting laser beams to a recording film 4 provided on a magneto-optic disk 3 through an optical head 2. The apparatus further comprises a bias magnetic field unit 5 for exerting a bias magnetic field to the recording film 4, a signal separation circuit 7 for receiving a magneto-optic playback signal 6 from the optical head 2 and transmitting a separation signal 8 to a binary coding circuit 9 which transmits a playback signal 10 to a CPU 14. The CPU 14 transmits a record/playback/erase changeover signal 12 to a semiconductor laser drive circuit 11 and also transmits a recording signal 13 to the bias magnetic field unit 5. The record/playback/erase changeover signal 12 and the recording signal 13 are also transmitted to the signal separation circuit 7 from the CPU 14. The laser beams emitted from the semiconductor laser unit 1 are focused onto the recording film 4 by means of the optical head 2. The recording film 4 is so designed as to be magnetized in a direction perpendicular to the film surface when in the data unrecording mode in such a manner that the magnetization of the recording film 4 is oriented, for example, in the direction from the laser beam incident side to the recording film 4 when in the unrecording mode.

Figure 9:
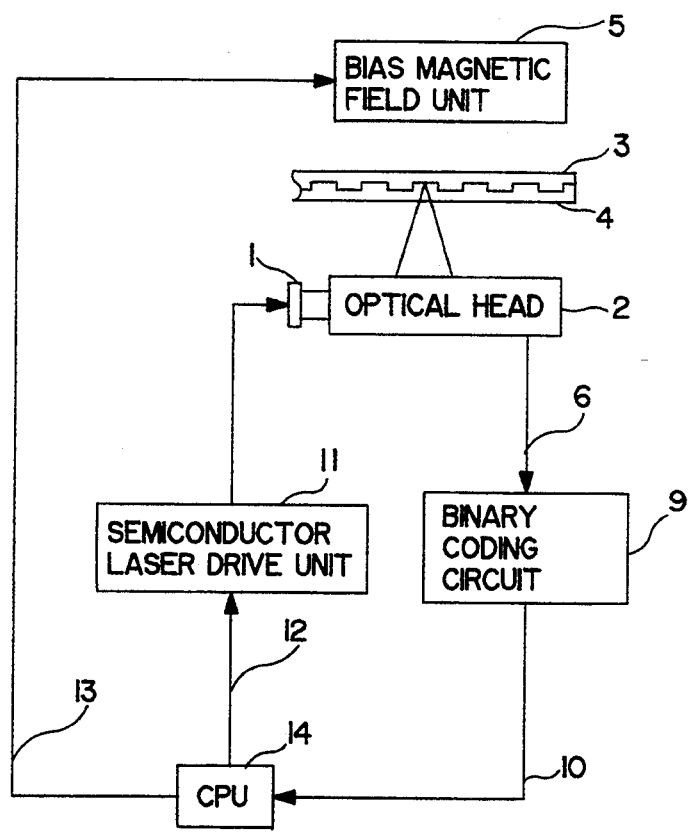
FIG. 9 is a block diagram of the construction of an ordinary conventional magneto-optic disk apparatus.
Figure 10:
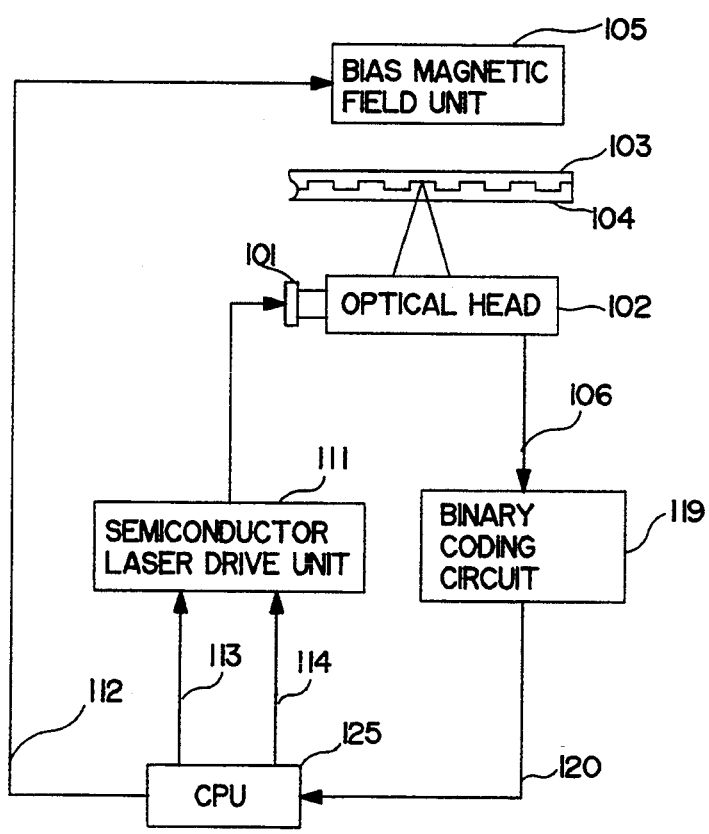
FIG. 10 is a block diagram of the construction of an ordinary conventional magneto-optic disk apparatus.
Figure 11:
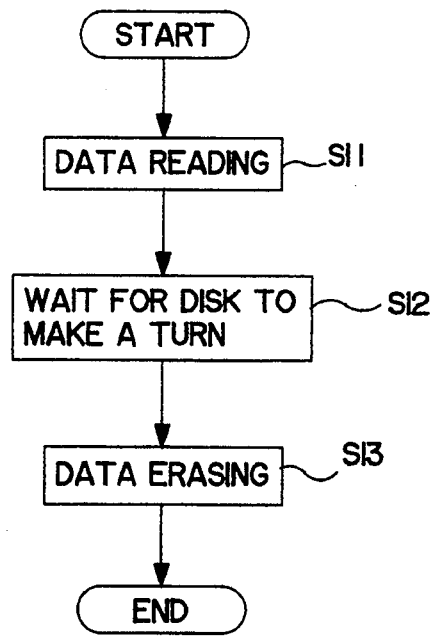
FIG. 11 is a flow chart of the erase-after-read operation of a conventional magneto-optic disk apparatus.
Figure 12:
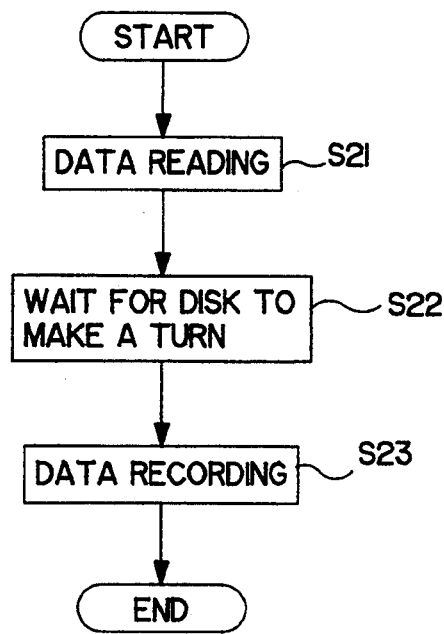
FIG. 12 is a flow chart of the write-after-read operation of a conventional magneto-optic disk apparatus.
Figure 13:
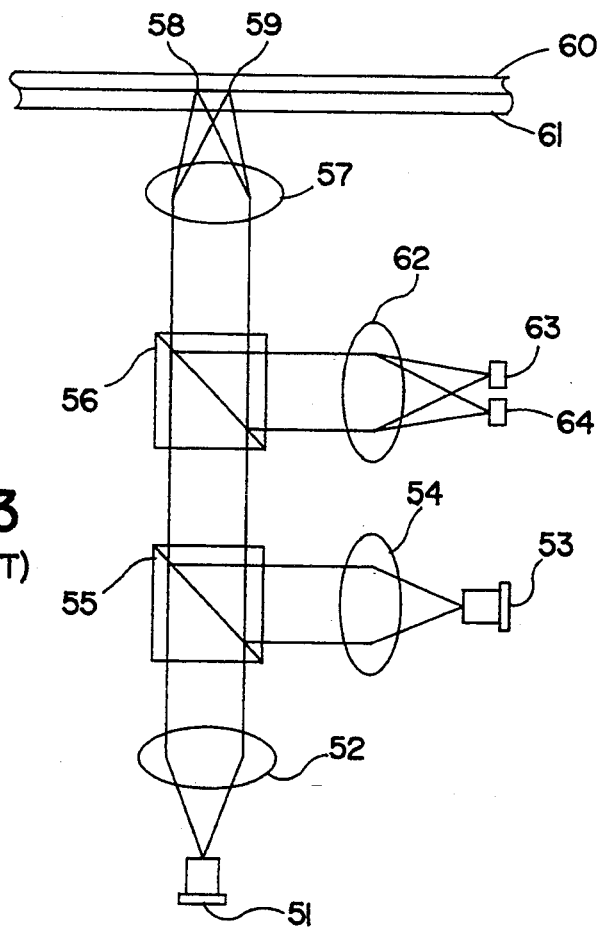
FIG. 13 is an explanatory view of an optical head employing two semiconductor laser units in a conventional magneto-optic disk apparatus.
Figure 14:
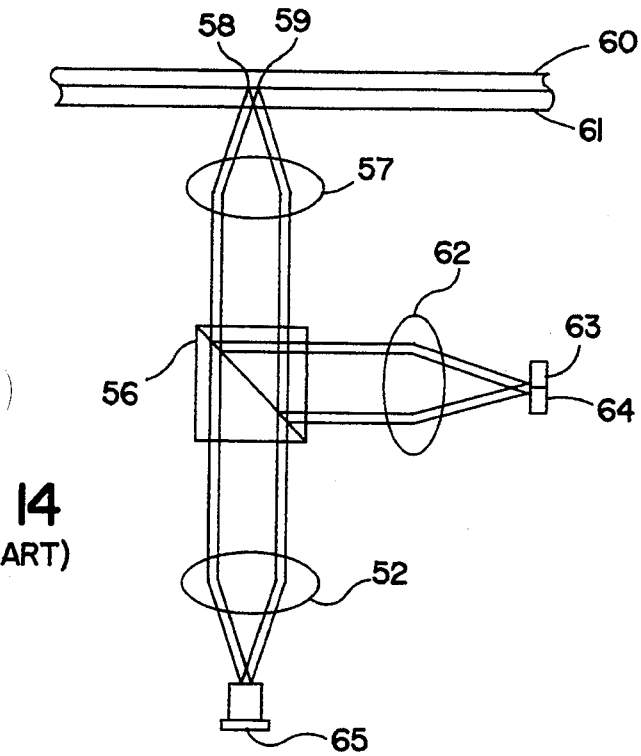
FIG. 14 is an explanatory view of an optical head employing a two-beam semiconductor laser unit in a conventional magneto-optic disk apparatus.
Figure 15:
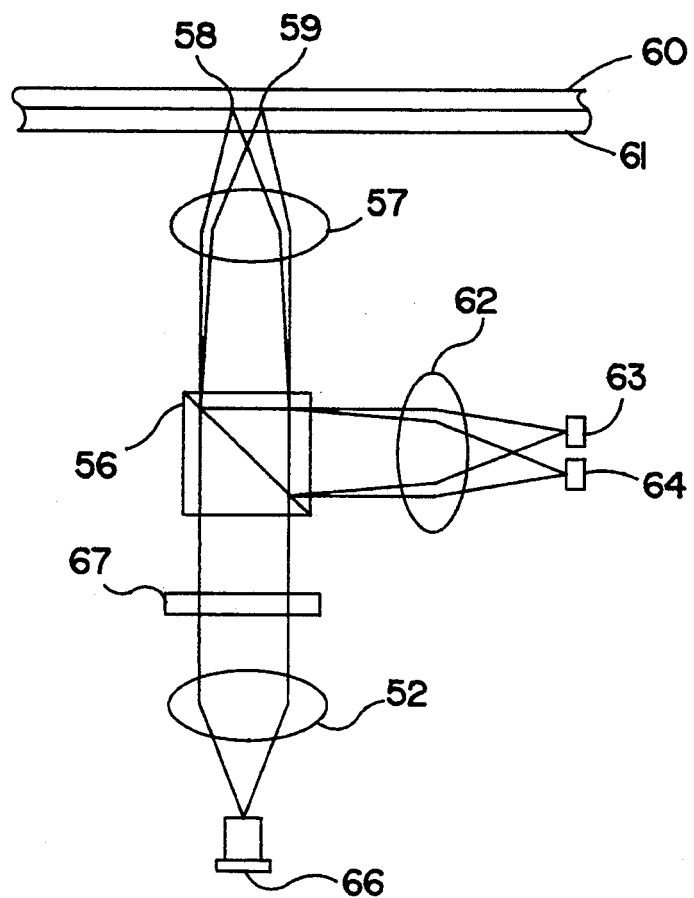
FIG. 15 is an explanatory view of an optical head employing a diffraction grating in a conventional magneto-optic disk apparatus.

The following describes the mutual relations and operations of the constituent elements of the magnetic field modulation type apparatus. It is noted that the theory and operations of recording data in the recording mode of the first embodiment shown in FIG. 1 are similar to those of the conventional apparatus as already described with reference to FIG. 9, and therefore no particular description is provided here.

In the playback mode, the CPU 14 transmits a record/playback/erase changeover signal 12 to the semiconductor laser drive circuit 11 to control the semiconductor laser unit 1 to generate such a low optical output of laser beam that the temperature of the laser beam incident portion of the recording film 4 is suppressed lower than the Curie point for maintaining the coercive force of the recording film, and under this condition the laser beam is applied to the recording film 4. The polarization of the applied laser beam is rotated according to Kerr effect when reflected on the recording film 4 due to an interaction with the magnetized recording film 4. Since the magnetization direction of the recording film 4 differs depending on which is selected the recording mode or the unrecording mode, the rotation direction and angle of the polarization of the reflected laser beam also differs. The rotation amount of the polarization of the reflected laser beam is detected by means of the optical head 2 to generate the magneto-optic playback signal 6. The magneto-optic playback signal 6 obtained in the playback operation mode contains only the signal component of the data already recorded. When the signal separation circuit 7 is driven to exert no change on the magneto-optic playback signal 6 with the record/playback/erase changeover signal 12 transmitted from the CPU 14, the magneto-optic playback signal 6 appears as it is in the separation signal 8 which is output of the signal separation circuit 7. In the above case, the separation signal 7 is required to carry out an operation accompanied by no change of Waveform, and therefore it is also permissible to bypass the signal separation circuit 7. The separation signal 8 is then converted into a binary data by means of the binary coding circuit 9. The CPU 14 reads the playback signal 10 of the binary data transmitted from the binary coding circuit 9 thereby to play back the recorded data signal.

The theory and operations of erasing data in the erasing mode are the same as those already described based on the conventional apparatus, and therefore the detail description thereof is omitted here.

First of all, reference is made to the write-after-read operation. According to the magnetic field modulation type apparatus, a direct overwriting operation is theoretically permissible. The write-after-read operation in accordance with the first embodiment of the present invention is carried out as follows. When data is recorded onto the recording film 4 of the magneto-optic disk 3 with application of a high-power laser beam generated by the semiconductor laser unit 1, the laser light reflected on the recording film 4 is detected by the optical head 2 to obtain the magneto-optic playback signal 6 in the same manner as in the playback operation mode. That is, the recording operation and the playback operation are simultaneously carried out. After processing the magneto-optic playback signal 6 in the signal separation circuit 7, the obtained separation signal 8 is converted into a binary data by means of the binary coding circuit 9, and then the CPU 14 reads the binary data 10 thereby to play back the recorded data signal simultaneously with a recording operation to thereby effect a write-after-read operation.

Figure 2A:
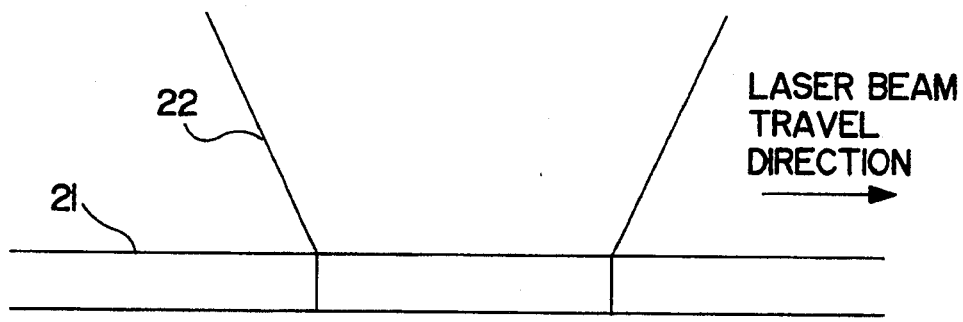
FIGS. 2(a) and 2(b) are an explanatory view of the state of a recording film in a write-after-read or erase-after-read operation.
Figure 2B:
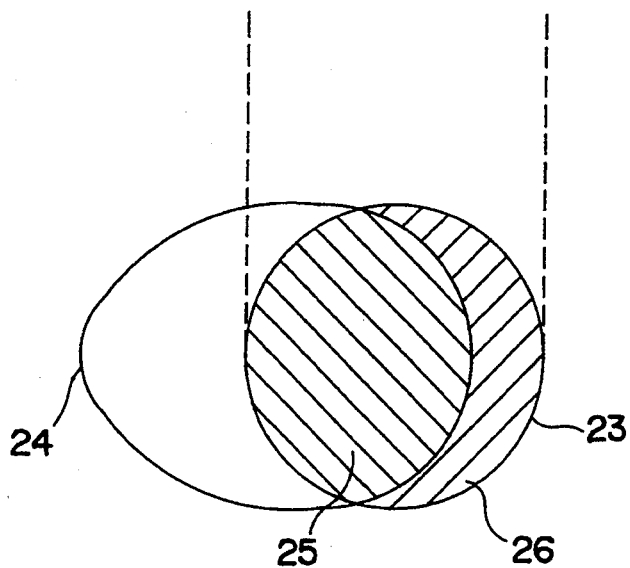

FIG. 2 shows a state of the recording film at the time of write-after-read operation. Referring to FIG. 2, when a portion of the recording film 21 of the magneto-optic disk reaches the laser beam application spot region 23 onto which a laser beam 22 is applied from the laser unit, the temperature of the laser beam applied portion of the recording film 21 is increased. Since a limited time lag exists in the increment of the temperature of the recording film portion applied with the laser beam 22 and since the magneto-optic disk is rotating, there takes place a specific displacement between the laser beam application region 23 and a region having a particular temperature distribution, e.g., a region (Tc) 24 having a temperature not lower than the Curie point, resulting in that the region (Tc) 24 follows the laser beam application region 23. Therefore, the laser beam application region 23 consequently consists of a region (A) 25 having a temperature not lower than the Curie point and a region (B) 26 having a temperature lower than the Curie point. When the temperature is increased not lower than the Curie point, the coercive force of the recording film 21 is reduced to zero and the magnetization of the recording film 21 is oriented in a direction of the magnetic field currently exerted from the bias magnetic field unit. Since the bias magnetic field is modulated according to a data signal to be recorded, the region (A) 25 having a temperature not lower than the Curie point is magnetically oriented according to the data signal to be recorded, and therefore the laser light reflected on the region (A) 25 contains the signal component of the data to be recorded. On the other hand, the temperature of the region (B) 26 is not yet increased to the Curie point, and therefore the region (B) 26 maintains the magnetization corresponding to the already recorded magnetic data, resulting in that the laser light reflected on the region (B) 26 contains a signal component of the data already recorded. As a consequence, the magneto-optic playback signal obtained by detecting the laser light reflected from the laser beam application region 23 of the recording film 21 by means of the optical head contains both a magneto-optic playback signal of the data to be recorded and a magneto-optic playback signal of the data already recorded. This means that the obtained signal can be assumed to be a composite formed by combining a signal independently obtained through playback of the reflected light of the laser beam applied to the region (A) 25 with a signal independently obtained through playback of reflected light of the laser beam applied to the region (B) 26.

Figure 3:
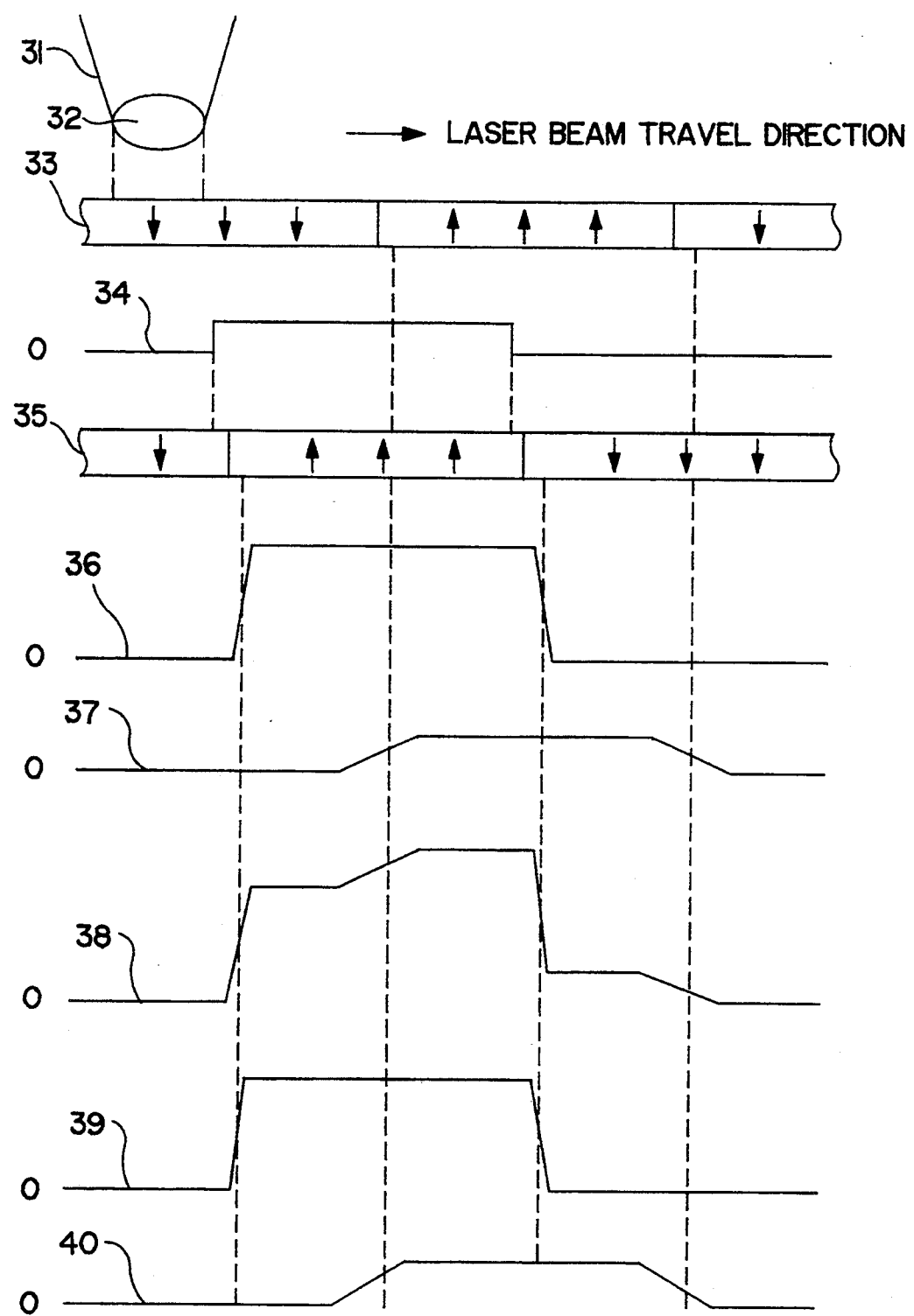
FIG. 3 is an explanatory view of the state of a magneto-optic playback signal in a recording operation.

FIG. 3 shows the state of a magneto-optic playback signal in the recording operation mode. Referring to FIG. 3, there are shown a laser beam 31, a laser application region 32, a magnetization direction 33 of a recording film, a recording signal 34, a bias magnetic field direction 35, and a magneto-optic playback signal 38 detected by means of the optical head. With the movement of the laser beam application region 32, a magneto-optic playback signal (a) 36 according to the bias magnetic field direction 35, i.e., a signal of the data to be recorded can be obtained from the region (A) 25. The reason why the inversion of the bias magnetic field 35 delays with respect to the recording signal 34 and the reason why the waveform of the magneto-optic playback signal (a) 36 is unsharpened (gently-sloping) are because of the specific response of the bias magnetic field unit influenced by such as the self-inductance of the magnetic field modulating coil, magnetic inversion response of the recording film with respect to the bias magnetic field, the response of the current-to-voltage conversion system in a light detection operation, etc. On the other hand, a magneto-optic playback signal (b) 37 corresponding to the data already recorded can be obtained from the region (B) 26. The reason why the magneto-optic playback signal (b) 37 is unsharpened (gently-sloping) is because of the spatial frequency response of the optical head, the response of the current-to-voltage conversion system in a light detection operation, and the like. A composite of both the above-mentioned signals 36 and 37 is a magneto-optic playback signal 38 obtained from the optical head. The difference in level between the magneto-optic playback signal (a) 36 and the magneto-optic playback signal (b) 37 depends on the intensity of the applied laser beam, the relative velocity between the medium and the laser beam, the sensitivity of the recording material and the like, as is proportional to the area ratio and laser beam intensity ratio between the regions (A) 25 and (B) 26 as shown in FIG. 2. The magneto-optic playback signal (a) 36 is a response signal obtained from the recording signal 34 transmitted through the bias magnetic field unit, the recording film, and the optical head, and therefore by using a unit simulating the transfer characteristics of the above-mentioned units, a simulated magneto-optic playback signal 39 equivalent to the magneto-optic playback signal (a) 36 can be obtained from the recording signal 34. The unit for effecting the above-mentioned characteristics, i.e., a simulated magneto-optic playback signal generating circuit can be realized by combining a necessary number of inductor, capacitor, and resistor units or by means of a digital processing filter. By subtracting thus-produced magneto-optic playback signal 39 from the magneto-optic playback signal 38 obtained from the optical head, a signal identical to the magneto-optic playback signal (b) 37 corresponding to the data already recorded can be obtained as a separation signal 40 thereby to enable separating and extracting the signal component of the data already recorded.

Figure 4:
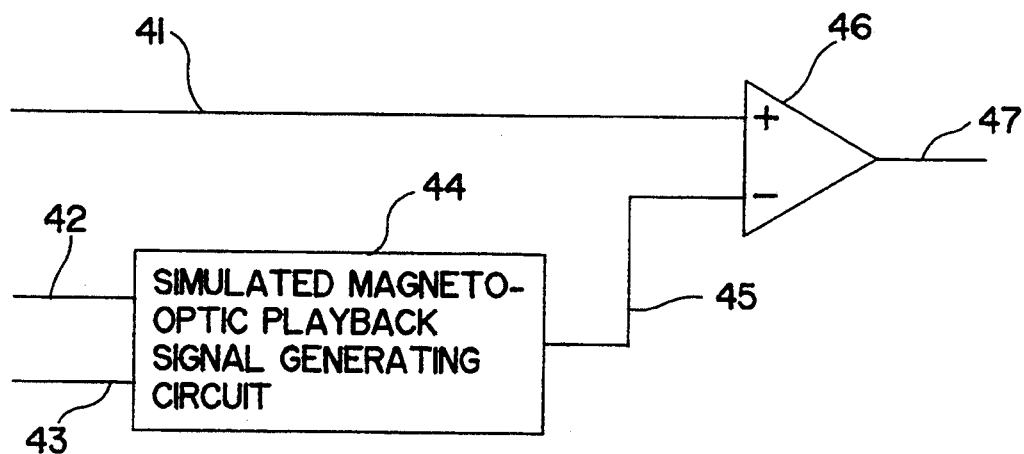
FIG. 4 is a block diagram of the construction of a signal separation circuit in a magneto-optic disk apparatus in accordance with an embodiment of the present invention.

FIG. 4 shows a block diagram of the construction of the signal separation circuit. Referring to FIG. 4, a magneto-optic playback signal 41 is applied to a plus terminal of a subtraction circuit 46, and a recording signal 42 and a record/playback/erase changeover signal 43 are applied to a simulated magneto-optic playback signal generating circuit 44 outputting a simulated magneto-optic playback signal 45 which is applied to a minus terminal of the subtraction circuit 46 outputting a separation signal 47. In the recording operation mode, the simulated magneto-optic playback signal generating circuit 44 is controlled with the record/playback/erase changeover signal 43 transmitted from the CPU to produce the simulated magneto-optic playback signal 45 from the recording signal 42. The simulated magneto-optic playback signal 45 is subtracted from the magneto-optic playback signal 41 by means of the subtraction circuit 46 to obtain the separation signal 47 of the data already recorded. The separation signal 47 is converted into a binary data through the binary coding circuit and the CPU reads the obtained binary data, whereby the data signal already recorded can be played back from the reflected light obtained when a recording laser beam is applied to the corresponding recording pit defined in the recording film.

Figure 5:
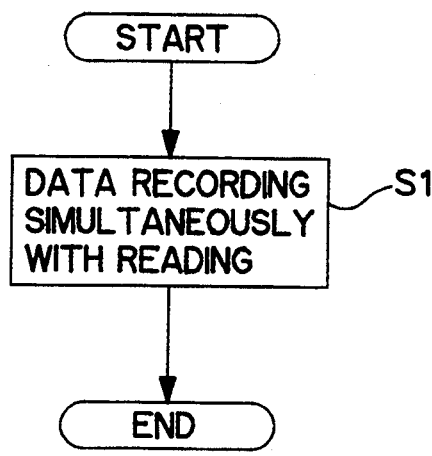
FIG. 5 is a flow chart of the write-after-read operation of a magneto-optic disk apparatus in accordance with an embodiment of the present invention.

FIG. 5 shows a flow chart of the above-mentioned write-after-read operation. Referring to FIG. 5, data in a specified portion is subject to playback operation while new data is recorded onto the same portion only at the step S1. Of course there takes place no waiting period for the magneto-optic disk to make a turn between the playback operation and the recording operation.

The following describes the erase-after-read operation. In the erase-after-read operation, the bias magnetic field is not modulated and the direction thereof is maintained in the same direction as that of the unrecording state, and the basic operation thereof is the same as that of the write-after-read operation. The region (A) 25 shown in FIG. 2 is magnetically oriented in the direction same as that of the unrecording state due to the bias magnetic field, and the reflection light reflected on the region (A) 25 contains no signal component. On the other hand, the region (B) 26 maintains the magnetic orientation corresponding to the data already recorded, and the reflection light reflected on the region (B) 26 contains a signal component of the data already recorded. Therefore, the reflection light reflected on the laser beam application region 23 contains only the magneto-optic signal of the data already recorded corresponding to the region (B) 26. By detecting such reflected light by means of the optical head and playing back the magneto-optic signal, the data signal already recorded can be played back.

Figure 6:
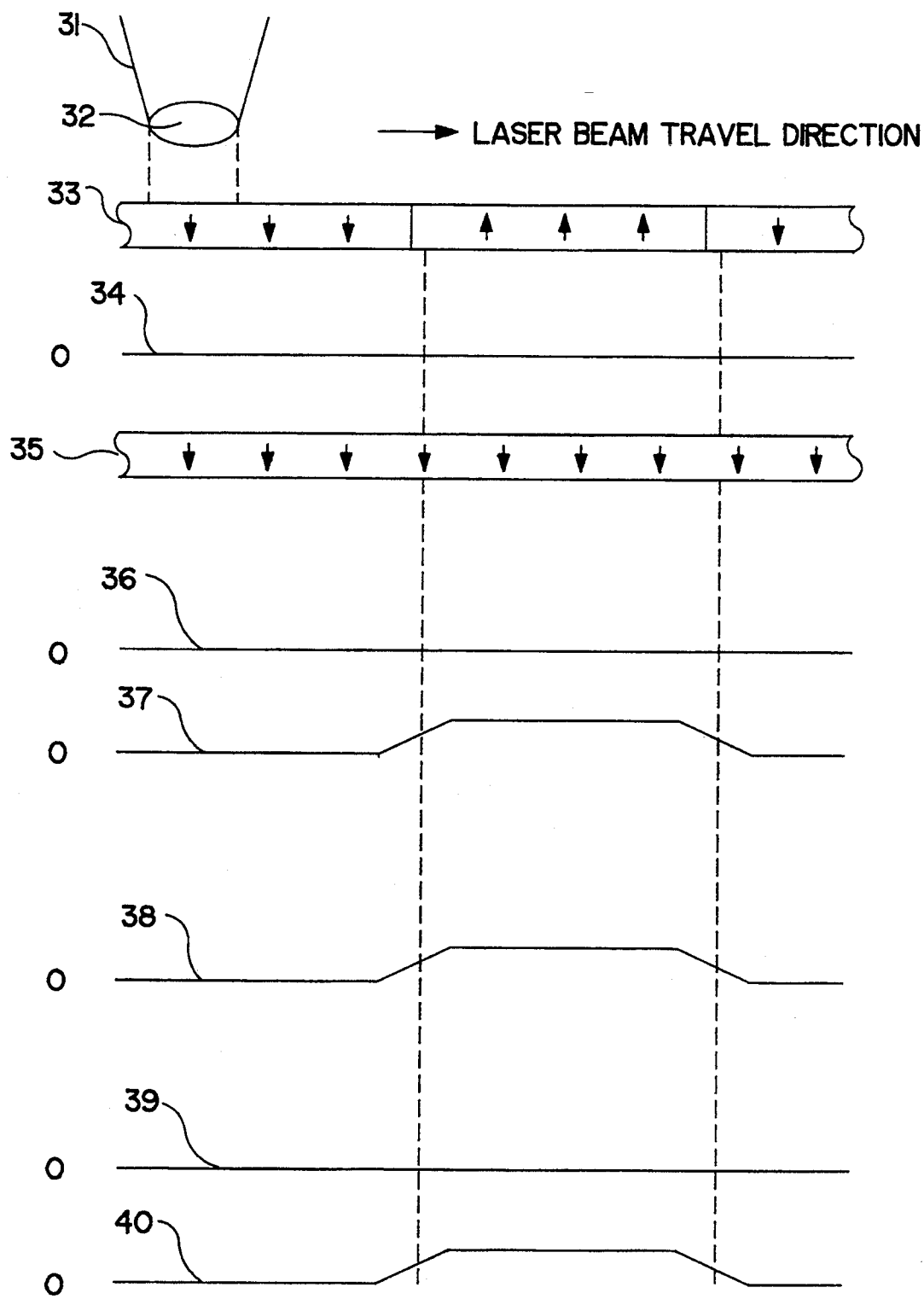
FIG. 6 is an explanatory view of the state of a magneto-optic playback signal in a magneto-optic disk apparatus in accordance with an embodiment of the present invention.

FIG. 6 shows the state of the magneto-optic playback signal obtained in the erasing operation. With the movement of the laser beam application region 32, the magneto-optic playback signal (a) 36 according to the bias magnetic field direction 35 (i.e., in the unrecording state) can be obtained from the region (A) 25. On the other hand, a magneto-optic playback signal (b) 37 of the data already recorded can be obtained from the region (B) 26. The reason why the magneto-optic playback signal (b) 37 is unsharpened (gently-sloping) is because of the same reasons as in the write-after-read operation. A composite of both the above-mentioned signals (a) 36 and (b) 37 is the magneto-optic playback signal 38. Since the magneto-optic playback signal (a) 36 is a silence signal of the unrecording state, the magneto-optic playback signal 38 becomes the magneto-optic playback signal (b) 37 without any modification. Therefore, it is not necessary to produce the simulated magneto-optic playback signal 39 nor necessary to process the magneto-optic playback signal 38, and the magneto-optic playback signal (b) 37 of the data already recorded can be obtained as the separation signal 40.

The signal separation circuit in FIG. 4 effects the operations as follows in the erase-after-read operation. In the recording mode, the simulated magneto-optic playback generating circuit 44 is controlled by transmission of the record/playback/erase changeover signal 43 from the CPU thereby to output a silence signal as the simulated magneto-optic playback signal 45. The simulated magneto-optic playback signal 45 is subtracted from the magneto-optic playback signal 41 by means of the subtraction circuit 46, which results in exerting no influence on the magneto-optic signal 41 which therefore appears as it is as the separation signal 47 without any modification. Since the magneto-optic playback signal 41 is no other than the signal of the data already recorded, the separation signal is converted into a binary data by means of the binary coding circuit and is read by the CPU, whereby the signal of the data already recorded can be correctly played back from the reflected light obtained at the time of applying a laser beam for erasing data to the recording pit defined in the recording film.

Figure 7:
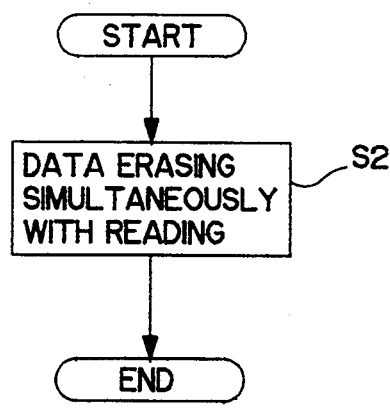
FIG. 7 is a flow chart of the erase-after-read operation of a magneto-optic disk apparatus in accordance with an embodiment of the present invention.

FIG. 7 shows a flow chart of the erase-after-read operation. Referring to FIG. 7, data in a specified portion is subject to playback while the data in the same portion is erased only at the step S2. Of course there takes place no waiting period for the magneto-optic disk to make a turn between the playback operation and the erasing operation in the present case.

The following describes a magneto-optic disk apparatus in accordance with a second embodiment of the present invention with reference to the drawings.

Figure 8:
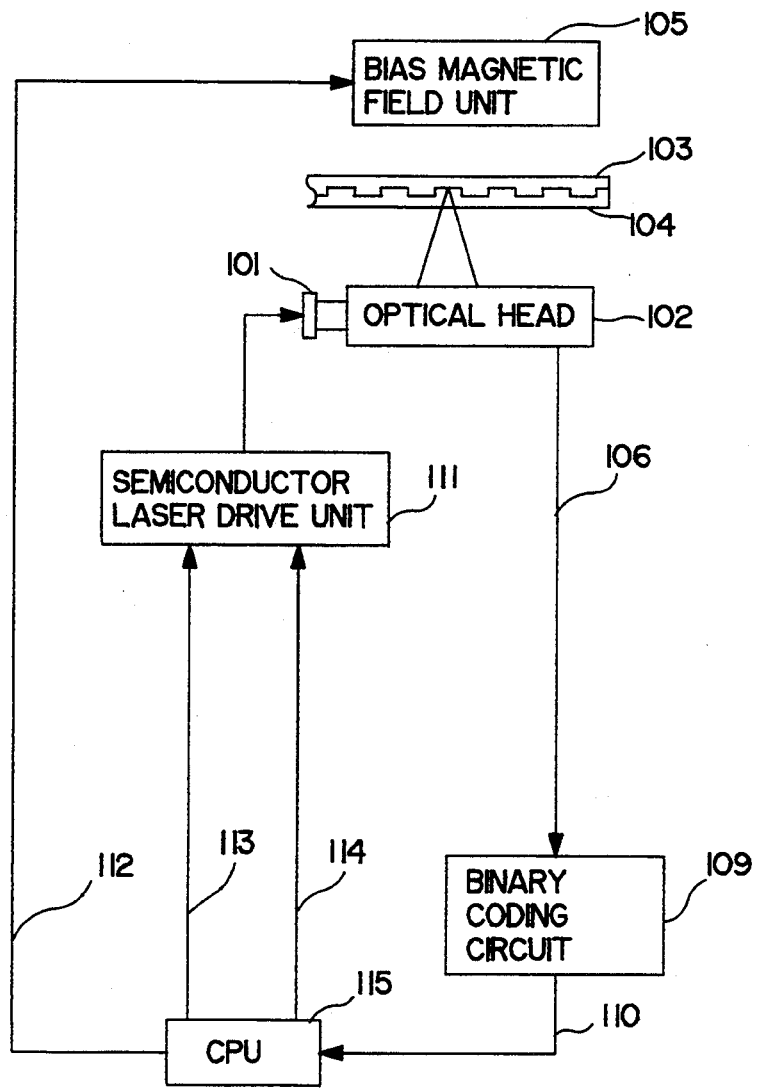
FIG. 8 is a block diagram of the construction of a magneto-optic disk apparatus in accordance with another embodiment of the present invention.

FIG. 8 shows a schematic diagram of an optical modulation type magneto-optic disk apparatus according to the second embodiment. Referring to FIG. 8, the magneto-optic disk apparatus comprises a semiconductor laser unit 101 for generating a laser beam, an optical head 102 receiving the laser beam reflected on the recording film 104 provided on the magneto-optic disk 103 and transmitting a magneto-optic playback signal 106 to a binary coding circuit 109 which transmits a playback signal 110 to a CPU 115. The apparatus further comprises a bias magnetic field unit 105 for exerting a bias magnetic field to the recording film 104, and a semiconductor laser drive circuit 111. The CPU 115 transmits a bias magnetic field control signal 112 to the bias magnetic field unit 105, a record/playback/erase changeover signal 113 and a recording signal 114 to the semiconductor laser drive circuit 111. A laser beam emitted from the semiconductor laser unit 101 is focused on the recording film 104 of the magneto-optic disk 103 by means of the optical head 102. The recording film 104 is magnetically oriented in a direction perpendicular to the film surface in the unrecording state in such a manner that the magnetization of the recording film 104 is oriented, for example, in the direction from the laser beam incident side to the recording film 104.

In the playback mode, the CPU 115 transmits the record/playback/erase changeover signal 113 to the semiconductor laser drive circuit 111 to control the semiconductor laser unit 101 to generate such a low output of laser beam that the temperature of the recording film 104 is suppressed lower than the Curie point, and under this condition the laser beam is applied to the recording film 104. The polarization of the applied laser beam is rotated when reflected on the recording film 104 due to an interaction with the magnetized recording film 104. Since the magnetic orientation of the recording film 104 differs depending on which is selected the recording state or the unrecording state, the rotation direction of the polarized laser beam differs. The rotation amount and direction of the polarization of the laser beam is detected by means of the optical head 102 thereby to obtain the magneto-optic playback signal 106. The magneto-optic playback signal 106 is converted into a binary data by means of the binary coding circuit 109 and is read by the CPU 115 thereby to play back the signal of the recorded data.

The following describes the erase-after-read operation. When carrying out an erasing operation with high-power laser beam application from the semiconductor laser unit 101 onto the recording film 104 of the magneto-optic disk 103, the reflection laser light reflected on the recording film 104 is detected by means of the optical head 102 simultaneously with a playback operation to obtain the magneto-optic playback signal 106. The obtained playback signal 106 is converted into a binary data by means of the binary coding circuit 109 and then read by the CPU 115, whereby the signal of the data already recorded is played back simultaneously with an erasing operation to effect the erase-after-read operation.

The theory and flow charts of the above-mentioned operations are the same as those described in conjunction with FIGS. 2, 6, and 7.

In any case of the magnetic field modulation type in FIG. 1 and optical modulation type in FIG. 8, the data played back and read according to the above-mentioned operations is temporarily stored in a memory provided inside the CPU 14 (FIG. 1) or the CPU 115 (FIG. 8) or stored in another independent memory unit. Thereafter when the occurrence of an faulty operation such as track jumping or an erroneous operation by the operator is confirmed, the necessary data can be easily recovered by rerecording the data onto the same portion on the disk or by rereading and relocating the data together with the relevant data in the same block.

It is noted that the above-mentioned data restoring operation attributed to the erroneous operation of the operator necessitates a time for the operator to confirm the situation. Therefore, the above-mentioned data recovering operation can be selected to be operable or inoperable.

As described above, the present invention provides a magneto-optic disk apparatus comprising: a semiconductor laser unit; a magneto-optic disk on which data is recorded or erased in a magnetic field modulation or optical modulation manner; an optical head which carries out recording, playback, or erasing of data by focusing a laser beam emitted from the semiconductor laser unit at a spot on the recording film of the magneto-optic disk; a signal separation circuit; a binary coding circuit for converting an output of the signal separation circuit into binary data; a semiconductor laser drive circuit for controlling the optical output of the semiconductor laser unit according to the recording, playback, or erasing operation; bias magnetic field means for exerting a bias magnetic field onto the recording film of the magneto-optic disk according to the recording or erasing operation; and a control circuit for controlling the operations of the above-mentioned constituent elements, whereby, when carrying out a recording or erasing operation by continuously applying the laser beam at a spot on the magneto-optic disk, data which is already recorded on the magneto-optic disk and just subject to a recording or erasing operation is read simultaneously with the recording or erasing operation by inputting a magneto-optic playback signal obtained from the reflection light reflected on the recording film on the magneto-optic disk in the recording or erasing operation to the signal separating circuit and separating the signal component of the data already recorded to form an output. With the above-mentioned construction, a highly-reliable magneto-optic disk apparatus capable of carrying out the write-after-read and erase-after-read operations without waiting for the magneto-optic disk to make a turn while assuring the data protection in such a case as a faulty or erroneous operation occurring in a high-speed operation. The same advantageous features can be effected in the magneto-optic disk apparatus which carries out a data recording in an optical modulation manner.

Furthermore, the feature of employing only one semiconductor laser unit and a single laser beam enables use of conventional optical and circuit systems without altering the present record/playback/erase system, which also enables providing a low-cost magneto-optic disk apparatus.

Although the present invention has described a record/playback apparatus employing a disk-shaped recording medium, it is obvious that the scope of the present invention is not limited to such a medium and applicable to an apparatus employing a card-shaped or tape-shaped recording medium.

As obvious from the above embodiments, the present invention provides a magneto-optic disk apparatus comprising a semiconductor laser unit, a magneto-optic disk on which data is recorded or erased in a magnetic field modulation or optical modulation manner, an optical head which carries out recording, playback, or erasing of data by focusing a laser beam emitted from the semiconductor laser unit at a spot on the recording film of the magneto-optic disk, a signal separation circuit, a binary coding circuit for converting an output of the signal separation circuit into a binary data, a semiconductor laser drive circuit for controlling the optical output of the semiconductor laser unit according to the recording, playback, or erasing operation, bias magnetic field means for exerting a bias magnetic field onto the recording film of the magneto-optic disk according to the recording or erasing operation, and a control circuit for controlling the operations of the above-mentioned constituent elements, whereby, when carrying out a recording or erasing operation by continuously applying the laser beam at a spot on the magneto-optic disk, data which is already recorded on the magneto-optic disk and just subject to a recording or erasing operation is read simultaneously with the recording or erasing operation by inputting a magneto-optic playback signal obtained from the reflection light reflected on the magneto-optic disk in the recording or erasing operation to the signal separating circuit and separating the signal component of the data already recorded to form an output. With the above-mentioned construction, a highly-reliable magneto-optic disk apparatus capable of carrying out the write-after-read and erase-after-read operations without waiting for the magneto-optic disk to make a turn while assuring the data protection in such a case as a faulty or erroneous operation occurring in a high-speed operation. Furthermore, the feature of employing only one semiconductor laser unit and a single laser beam enables use of conventional optical and circuit systems without altering the present record/playback/erase system, which also enables providing a low-cost magneto-optic disk apparatus.

As described above, any data recording or erasing operation is carried out in the write-after-read or erase-after-read manner and the read data is stored in a control circuit. With the above arrangement, in the case that a recording or erasing operation effected at a portion on the disk is incorrect, or in the case that a faulty operation takes place in the course of a recording or erasing operation, the corresponding data can be recovered by rerecording the stored data onto the magneto-optic disk.

Although the present invention has been fully described by way of examples with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A magneto-optic disk apparatus of a magnetic field modulation type comprising:

semiconductor laser means for applying a laser beam onto a recording film provided on a magneto-optic disk to record data and to erase the recorded data;

optical head means which carries out recording, playback, and erasing of data by focusing the laser beam emitted from said semiconductor laser means onto a spot on said recording film;

semiconductor laser drive means for controlling the output of said semiconductor laser means by selecting one of the recording, playback, and erasing operations;

bias magnetic field means for exerting a bias magnetic field onto the recording film of said magneto-disk according to the selected operation of the recording and erasing operations;

control means for controlling the entire part of said magneto-optic disk apparatus;

signal separation means for separating a magneto-optic playback signal outputted by said optical head means, said signal separation means being comprised of a simulated magneto-optic playback signal generating means for generating a simulated magneto-optic playback signal from one of a recording signal and an erasing signal inputted thereto and comprised of a subtraction means for obtaining a difference between the simulated magneto-optic playback signal generated from said simulated magneto-optic playback signal generating means and a magneto-optic playback signal outputted by said optical head means to thereby form an output by separating the recorded data signal from the magneto-optic playback signal based on a signal representing the difference;

binary coding means for converting an output of said signal separation means into binary data;

whereby, when carrying out a recording or erasing operation by continuously applying the laser beam at a spot on the recording film, data which is already recorded on the recording film and just before subject to one of the recording and erasing operations is read simultaneously with the corresponding recording and erasing operation by separating the signal component of the data already recorded to form an output in accordance with the output data of said binary coding means.

2. A magneto-optic disk apparatus of a magnetic field modulation type as claimed in claim 1, wherein said simulated magneto-optic playback signal generating means is constructed by a filter having a characteristic equivalent to the transfer characteristics of the bias magnetic field means, the recording film, and the optical head means.

3. A magneto-optic disk apparatus of a magnetic field modulation type as claimed in claim 1, wherein the characteristic of said simulated magneto-optic playback signal generating means is switched depending on the selection of one of the recording operation and playback operation.

4. A magneto-optic disk apparatus of a magnetic field modulation type comprising:

semiconductor laser means for applying a laser beam onto a recording film provided on a magneto-optic disk to record data and to erase the recorded data;

optical head means which carries out recording, playback, and erasing of data by focusing the laser beam emitted from said semiconductor laser means onto a spot on said recording film;

signal separation means for separating a magneto-optic playback signal outputted by said optical head means;

binary coding means for converting an output of said signal separation means into binary data;

semiconductor laser drive means for controlling the output of said semiconductor laser means by selecting one of the recording, playback, and erasing operations;

bias magnetic field means for exerting a bias magnetic field onto said magneto-optic disk according to the selected operation of the recording and erasing operations; and control means for controlling the entire part of said magneto-optic disk apparatus, whereby, when carrying out a recording or erasing operation by continuously applying the laser beam at a spot on the recording film, data which is already recorded on the recording film and just subject to one of the recording and erasing operations is read simultaneously with the corresponding recording and erasing operation by inputting the magneto-optic playback signal obtained from the reflection laser light reflected on the magneto-optic disk to separation means and separating the signal component of the data already recorded to form an output, wherein the binary data converted by said binary coding means from the read out data before write or before erase corresponding to the read data just subject to a recording or erasing operation is stored in said control means for more than a specified time period after completing the recording and erasing operation.

5. A magneto-optic disk apparatus of a magnetic field modulation type as claimed in claim 4, wherein said signal separation means further comprises simulated magneto-optic playback signal generating means for generating a simulated magneto-optic playback signal from a recording signal inputted thereto and subtraction means for obtaining the difference between the simulated magneto-optic playback signal and a magneto-optic playback signal to form an output by separating the recorded data signal from the magneto-optic playback signal based on a signal representing the difference.

6. A magneto-optic disk apparatus of a magnetic field modulation type as claimed in claim 13, wherein said simulated magneto-optic playback signal generating means is constructed by a filter having a characteristic equivalent to the transfer characteristics of the bias magnetic field means, the recording film, and the optical head means.

7. A magneto-optic disk apparatus of a magnetic field modulation type as claimed in claim 4, wherein the characteristic of said simulated magneto-optic playback signal generating means is switched depending on the selection of one of the recording operation and playback operation.

8. A magneto-optic disk apparatus of a magnetic field modulation type as claimed in claim 4, wherein the data which is read before the recording or erasing operation and stored in the control means is recorded again on the magneto-optic disk when needed.

9. A magneto-optic disk apparatus of an optical modulation type comprising:

semiconductor laser means for applying a laser beam onto a recording film provided on a magneto-optic disk to record data and to erase the recorded data;

optical head means which carries out recording, playback, and erasing of data by focusing the laser beam emitted from said semiconductor laser means onto said recording film;

binary coding means for converting an output of said optical head means into binary data;

semiconductor laser drive means for controlling the output of said semiconductor laser means according to the selection of one of the recording, playback, and erasing operations;

bias magnetic field means for exerting a bias magnetic field onto said recording film according to the selected one of the recording and erasing operations; and control means for controlling the entire part of said magneto-optic disk apparatus, whereby, when carrying out an erasing operation by continuously applying a laser beam onto the recording film, the recorded data on the recording film is read by detecting laser light reflected on the recording film by the optical head means, converting a magneto-optic playback signal obtained from the optical head means into binary data through said binary coding means, whereby the binary data is read by control means at the same time the data recorded on the magneto-optic disk is erased, wherein an output of said binary coding means is stored in a memory circuit for more than a specified time period after completing an erasing operation.

10. A magneto-optic disk apparatus of an optical modulation type as claimed in claim 9, wherein data stored in said control means is recorded again onto the magneto-optic disk when needed.

* * * * *